(12) United States Patent
Qiu et al.

(10) Patent No.: US 6,684,251 B1
(45) Date of Patent: Jan. 27, 2004

(54) DYNAMIC CONNECTION SET-UP IN A COMMUNICATION NETWORK

(75) Inventors: Chaoxin Qiu, Olathe, KS (US); Timothy G. Kelley, Shawnee, KS (US); Matthew Barrow, Overland Park, KS (US); Joseph G. Moore, Wichita, KS (US); Benjamin J. Ewy, Olathe, KS (US); Shannon Silvus, Penfield, NY (US); Murat Bog, Fremont, CA (US)

(73) Assignee: Sprint Communications Company, L.P., Overland Park, KS (US)

( * ) Notice: Subject to any disclaimer, the term of this patent is extended or adjusted under 35 U.S.C. 154(b) by 0 days.

(21) Appl. No.: 09/578,629

(22) Filed: May 25, 2000

(51) Int. Cl.[7] ............................................. G06F 15/16
(52) U.S. Cl. ..................... 709/228; 709/228; 370/395.2
(58) Field of Search ................................. 709/227, 228, 709/238; 370/395.2, 410, 231, 230

(56) References Cited

U.S. PATENT DOCUMENTS

| | | | | |
|---|---|---|---|---|
| 5,386,417 A | * | 1/1995 | Daugherty et al. | 370/352 |
| 5,933,412 A | * | 8/1999 | Choudhury et al. | 370/218 |
| 6,011,777 A | * | 1/2000 | Kunzinger | 370/236.1 |
| 6,108,705 A | * | 8/2000 | Svennevik et al. | 709/227 |
| 6,434,612 B1 | * | 8/2002 | Hughes et al. | 709/223 |
| 6,480,888 B1 | * | 11/2002 | Pedersen | 709/218 |
| 6,483,836 B1 | * | 11/2002 | Gazier et al. | 370/395.21 |
| 6,529,959 B1 | * | 3/2003 | Armistead et al. | 709/238 |
| 6,563,835 B1 | * | 5/2003 | Chen | 370/410 |

* cited by examiner

*Primary Examiner*—Ario Etienne
*Assistant Examiner*—Abdullahi E. Salad

(57) ABSTRACT

A communication network comprises a service layer, layer interface, and network layer to dynamically set-up a connection for a session. The service layer receives and processes a service request for a user system to generate and transfer a connection request. The connection request includes a connection identifier to correlate the connection with the session. The service-to-network layer interface receives and processes the connection request to generate and transfer the signaling messages that include the connection identifier. The network layer receives the signaling messages, and in response, dynamically establishes the connection. The connection is comprised of three segments that are established concurrently by the network layer.

8 Claims, 2 Drawing Sheets

DYNAMIC CONNECTION SET-UP IN A COMMUNICATION NETWORK

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of communication networks, and in particular, to a communication network that dynamically establishes connections.

2. Description of the Prior Art

Communication networks are often logically separated into a service layer and a network layer for design purposes. The service layer interacts with users to determine the requested services and the requirements to provide the service. The network layer provides connections based on these requirements. Unfortunately, the service layer and network layer often establish connections too slowly. The user is irritated by the inefficiency caused by delays in communication.

Typically, it is desirable to use one set of service logic in the service layer, but to use equipment from different suppliers in the network layer. Unfortunately, one set of service logic cannot effectively control an array of devices from different suppliers in the network layer. As a result, a custom set of service logic is required in the service layer for each different supplier providing equipment in the network layer. Multiple sets of service logic is inefficient.

The Telecommunications Information Network Architecture Consortium (TINA-C) has described a detailed architecture for a service layer in a complex commercial network. The Asynchronous Transfer Mode (ATM) Forum has described network layer systems for a complex commercial network. The ATM Forum specifies interfaces for establishing connections with the two major examples being the User to Network Interface (UNI) and the Network to Network Interface (NNI). Other types of network layers, such as Internet Protocol (IP) systems, are also available. Technology is needed to allow the service layer to inter-operate more efficiently with the network layer.

SUMMARY OF THE INVENTION

The invention solves the above problems with a communication network that concurrently sets-up segments of the connection to reduce set-up time. The communication network also insulates the service layer from the network layer so one set of service logic can control a diverse array of connection equipment in the network layer.

The communication network comprises a service layer, layer interface, and network layer to dynamically set-up a connection for a session. The service layer receives and processes a service request to generate and transfer a connection request. The connection request includes a connection identifier to correlate the connection with the session. The service-to-network layer interface receives and processes the connection request to generate and transfer the signaling messages that include the connection identifier. The network layer receives the signaling messages, and in response, dynamically establishes the connection. The connection is comprised of three segments that are established concurrently by the network layer.

BRIEF DESCRIPTION OF THE DRAWINGS

The same reference number represents the same element on all drawings.

DETAILED DESCRIPTION OF THE INVENTION

Figure 1:
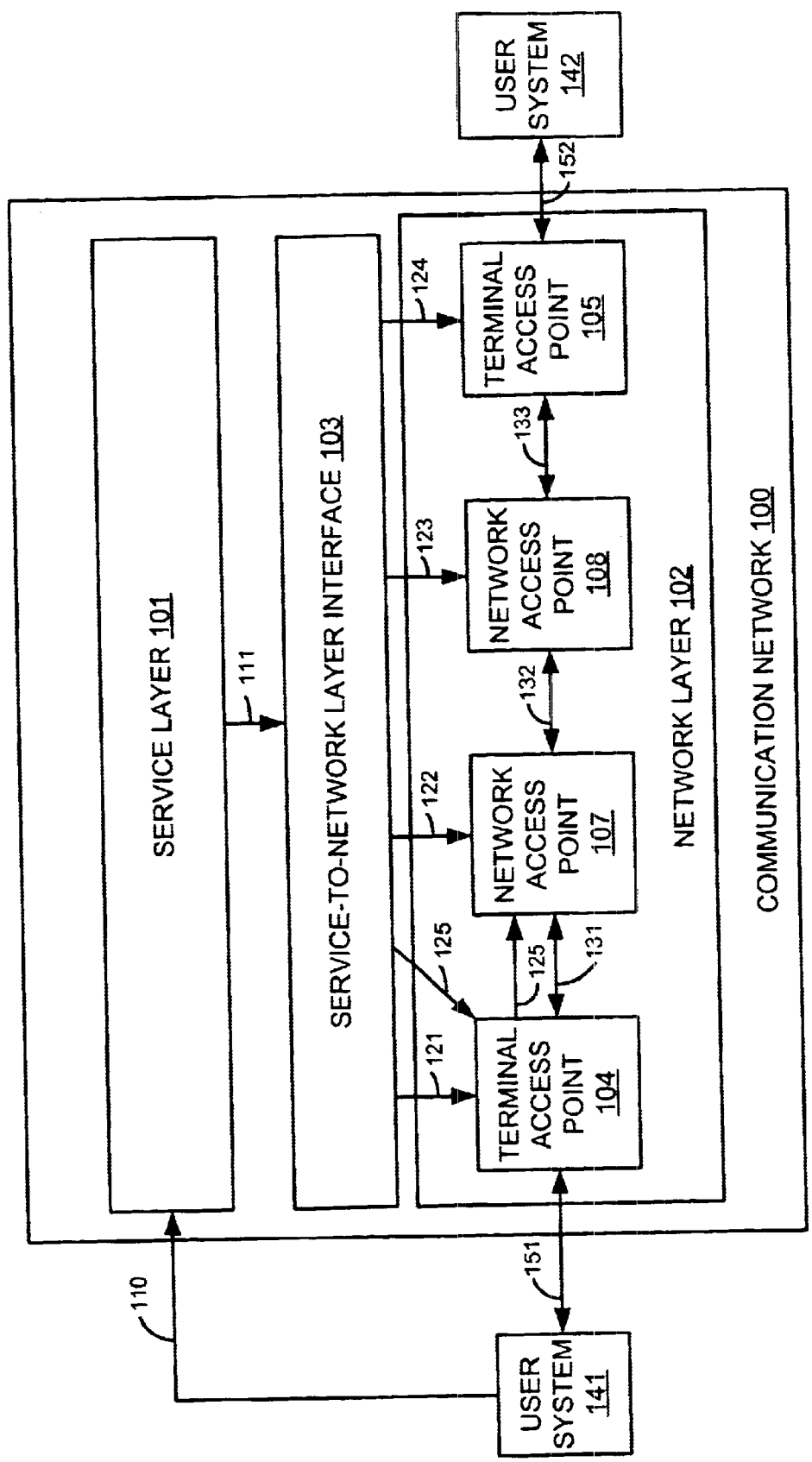
FIG. 1 illustrates a communication network in an example of the invention.

FIG. 1 illustrates a communication network 100 in an example of the invention. Communication network 100 is coupled to user system 141 by communication path 151 and to user system 142 by communication path 152. The user systems 141–142 and the communication paths 151–152 represent any equipment capable of exchanging information with the communication network 100. Some examples of such equipment include, but are not limited to, private branch exchanges, primary rate interface devices, computer systems, wireless devices, telephone switches, IP routers, data systems, and distributed ATM switching systems.

The communication network 100 is comprised of a service layer 101 and a network layer 102 that are coupled by a service-to-network layer interface 103. The network layer 102 includes terminal access points 104–105 and network access points 107–108. The user systems 141–142 are respectively coupled to the terminal access points 104–105. The terminal access points 104–105 are respectively coupled to the network access points 107–108. The network access points 107–108 are coupled together. The communication network 100 operates as follows to dynamically set-up a connection for a session between the user systems 141–142. The service layer 101 receives a service request 110 from the user system 141, although the service request 110 could alternatively come from a proxy system. The service layer 101 processes the service request 110 to generate and transfer a connection request 111. The connection request 111 includes a connection identifier to correlate the connection with the session. The service-to-network layer interface 103 receives and processes the connection request 111 to generate and transfer the signaling messages 121–124 that include the connection identifier.

The terminal access points 104–105 respectively receive the signaling messages 121 and 124. The network access points 107–108 respectively receive the signaling messages 122 and 123. In response to the signaling messages 121–122, the terminal access point 104 and the network access point 107 dynamically establish a first segment 131 of the connection. In response to the signaling messages 122–123, the network access points 107–108 dynamically establish a second segment 132 of the connection. In response to the signaling messages 123–124, the network access point 108 and the terminal access point 105 dynamically establish a third segment 133 of the connection. Thus, the connection is comprised of three segments 131-133. The three segments 131–133 are established concurrently with one another.

Advantageously, the concurrence of connection set-up in the three segments 131–133 significantly reduces connection set-up time. Reduced set-up time improves customer satisfaction by reducing post-dial delay. The segments 131 and 133 typically have different characteristics from the segment 132. The separation of connection set-up into the three segments allows a flexible design that is focused on the differing characteristics of each segment.

Advantageously, the service-to-network layer interface 103 provides insulation between the service layer 101 and the network layer 102. This insulation allows a single integrated set of service logic to control a diverse array of connection equipment in the network layer 102. The connection identifier facilitates both the concurrent connection set-up and the interface between layers.

Figure 2:
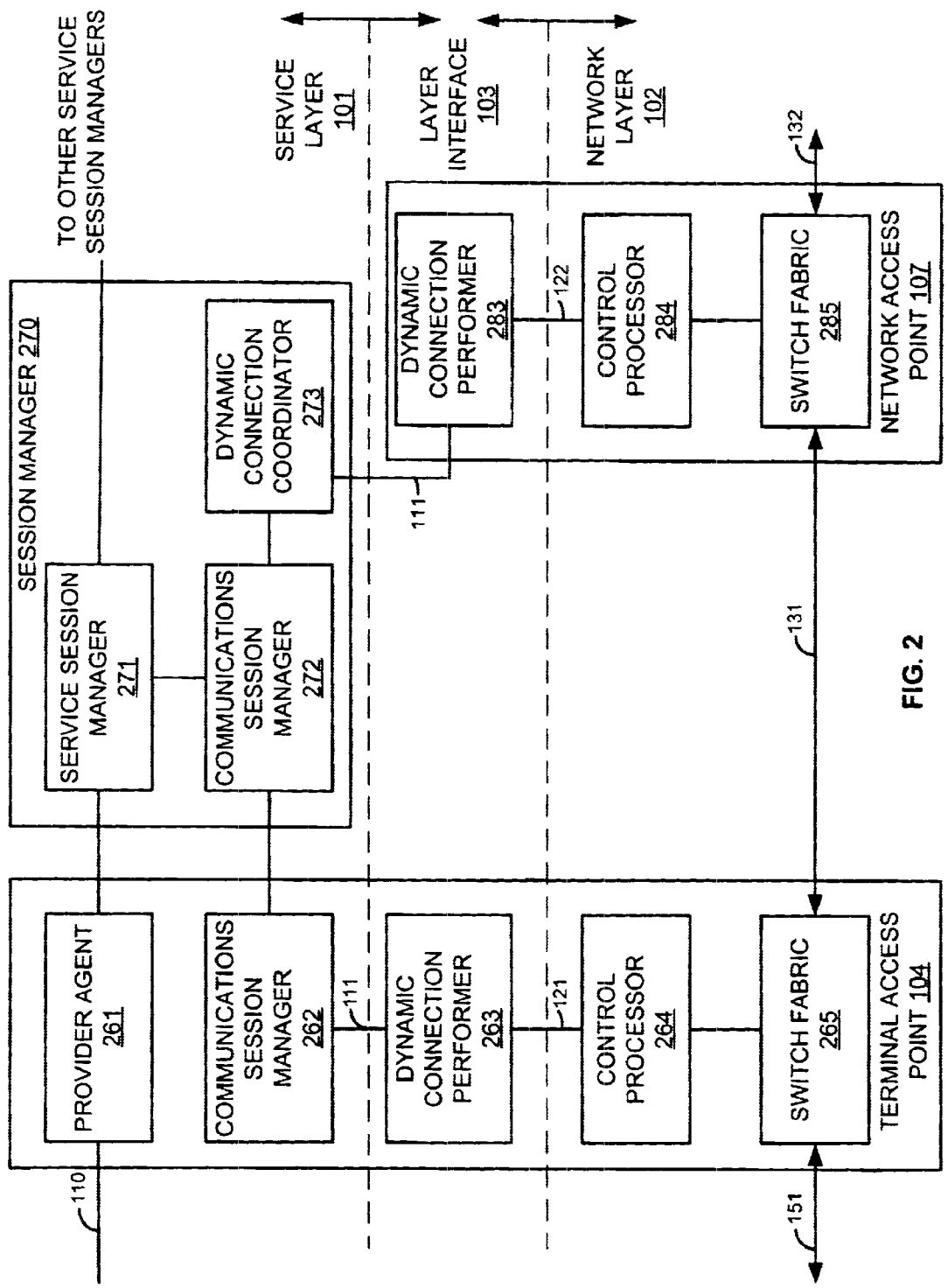
FIG. 2 illustrates a service layer, network layer, and layer interface in an example of the invention.

FIG. 2 depicts service layer 101, network layer 102, and layer interface 103 in an example of the invention. For illustrative purposes in this example, the service layer 101 is TINA-C compliant and the network layer 102 is ATM Forum compliant. The invention is readily applicable to other types of service and network layers, and those skilled in the art will appreciate numerous variations from the following example that do not depart from the scope of the invention. Those skilled in the art will also appreciate that various features described below could be combined with the above-described example to form multiple variations of the invention.

FIG. 2 depicts the service layer 101, network layer 102, and layer interface distributed across the terminal access point 104, network access point 107, and session manager 270. The terminal access point 104 is comprised of provider agent 261, communication session manager 262, dynamic connection performer 263, control processor 264, and switch fabric 265. The session manager 270 is comprised of a service session manager 271, communication session manager 272, and dynamic connection coordinator 273. The network access point 107 is comprised of a dynamic connection performer 283, control processor 284, and switch fabric 285. These elements are interconnected by various control links that transfer messages as described below.

The service layer 101 is configured to operate in accord with TINA-C specifications and comprises the provider agent 261, service session manager 271, communication session managers 262 and 272, dynamic connection coordinator 273, and associated control links. The network layer 102 is configured to operate in accord with UNI 4.0 specifications from the ATM Forum and comprises control processors 264 and 284, switch fabrics 265 and 285, and associated control links and communication paths.

The layer interface 103 comprises the dynamic connection performers 263 and 283. The dynamic connection performers 263 and 283 are configured to provide an interface between the TINA-C compliant service layer 101 and ATM Forum compliant network layer 102. Typically, the communication network 100 will have one TINA-C control system in the service layer 101, but use several devices from diverse manufacturers in the network layer 102. The dynamic connection performers 263 and 283 insulate the service layer 101 control system from the different devices in the network layer 102. Advantageously, the insulation allows a service to be implemented in the service layer 101 using uniform software, despite the diversity of devices in the network layer 102.

The provider agent 261 interacts with the user system 141 to receive the service request 110 which is passed to the service session manager 271. The service session manager 271 interacts with the provider agent 261 and federates with other service session managers to determine service requirements based on the service request 110. The service session manager 271 transfers the service requirements to the communications session manager 272. The communication session manager 272 determines end-to-end connection requirements based on the service requirements from the service session manager 271.

The communication session manager 272 provides connection requirements to the communication session manager 262. The communication session manager 262 provides the connection requirements 111 for the first segment 131 to the dynamic connection performer 263. The dynamic connection performer 263 converts the TINA-C connection requirements 111 into the UNI 4.0 signaling message 121 for the network layer 102. The dynamic connection performer 263 transfers the signaling message 121 to the control processor 264. In this example of the invention, UNI 4.0 proxy signaling capability is required in control processor 264.

The communication session manager 272 also provides connection requirements to the dynamic connection coordinator 273. The dynamic connection coordinator 273 provides the connection requirements 111 for the first segment 131 and the second segment 132 to the dynamic connection performer 283. The dynamic connection performer 283 converts the TINA-C connection requirements 111 into the UNI 4.0 signaling message 122 for the network layer 102. The dynamic connection performer 283 transfers the signaling message 122 to the control processor 284.

In response to the signaling message 121, the control processor 264 causes the switch fabric 265 to interconnect the user communication path 151 with the first segment 131. In response to the signaling message 122, the control processor 284 causes the switch fabric 285 to interconnect the first segment 131 with the second segment 132. In response to the federation and in a similar fashion, the second segment 132 is interconnected to the third segment 133, and the third segment 133 is interconnected to the user communication path 152.

If desired, the provider agent 261 and the communications session manager 262 could be re-located to the session manager 270. An application programming interface is then added to the terminal access point 104 to provide an interface between the user system 141 and the re-located provider agent 261.

Although UNI 4.0 signaling is used in the above examples of the invention, UNI 3.1 signaling could be used in alternative examples of the invention. The use of UNI 3.1 signaling is discussed with reference to FIG. 1. UNI 3.1 signaling does not support proxy control that is required by TINA-C systems. With UNI 3.1, a signaling link from the terminal access point 104 to the network access point 107 must be used to control the network access-point 107. If UNI 3.1 signaling is used, then a tunnel is established from the layer interface 103 to the terminal access point 104 where the tunnel is connected to the UNI 3.1 signaling link to the network access point 107. Instead of the signaling message 122, the layer interface 103 transfers a UNI 3.1 signaling message 125 to the network access point 107 through the tunnel to the terminal access point 104 and the UNI 3.1 signaling link from the terminal access point 104 to the service node 107. This arrangement simulates proxy signaling from the service layer 101 to the network layer 102.

Those skilled in the art will appreciate variations of the above-described embodiments that fall within the scope of the invention. As a result, the invention is not limited to the specific examples and illustrations discussed above, but only by the following claims and their equivalents.

We claim:

1. A method for operating a communication network having a service layer and a network layer to dynamically set-up a connection for a session, the method comprising:

receiving and processing a service request in the service layer to generate and transfer a connection request for the connection wherein the connection request includes a connection identifier to correlate the connection with the session;

receiving and processing the connection request in a service-to-network layer interface to generate and transfer first, second, third, and fourth signaling messages including the connection identifier;

receiving the first signaling message in a first terminal access point and receiving the second signaling message in a first network access point, and in response to the first and second signaling messages, dynamically establishing a first segment of the connection between the first terminal access point and the first network access point;

receiving the third signaling message in a second network access point, and in response to the second and third signaling messages and concurrently with establishing the first segment of the connection, dynamically establishing a second segment of the connection between the first network access point and the second network access point; and receiving the fourth signaling message in a second terminal access point, and in response to the third and fourth signaling messages and concurrently with establishing the first and second segments of the connection, dynamically establishing a third segment of the connection between the second network access point and the second terminal access point.

2. The method of claim 1 wherein the connection identifier is included in the signaling messages in a Generic Identifier Transport Information Element.

3. The method of claim 1 wherein at least some of the signaling messages are User-to-Network Interface 4.0 signaling messages.

4. The method of claim 1 wherein at least some of the signaling messages are User-to-Network Interface 3.1 signaling messages.

5. A communication network configured to dynamically set-up a connection for a session, the communication network comprising:

a service layer configured to receive and process a service request to generate and transfer a connection request for the connection wherein the connection request includes a connection identifier to correlate the connection with the session;

a service-to-network layer interface configured to receive and process the connection request to generate and transfer first, second, third, and fourth signaling messages including the connection identifier;

a first terminal access point configured to receive the first signaling message, and in response, to dynamically establish a first segment of the connection;

a first network access point configured to receive the second signaling message, and in response, to dynamically establish the first segment of the connection and a second segment of the connection concurrently with the first segment of the connection;

a second network access point configured to receive the third signaling message, and in response, to dynamically establish the second segment of the connection and a third segment of the connection concurrently with the first and second segments of the connection; and a second terminal access point configured to receive the fourth signaling message, and in response, to dynamically establish the third segment of the connection concurrently with the first and second segments of the connection.

6. The communication network of claim 5 wherein the connection identifier is included in the signaling messages in a Generic Identifier Transport Information Element.

7. The communication network of claim 5 wherein at least some of the signaling messages are User-to-Network Interface 4.0 signaling messages.

8. The communication network of claim 5 wherein at least some of the signaling messages are User-to-Network Interface 3.1 signaling messages.

* * * * *